(12) United States Patent
Jeong

(10) Patent No.: US 11,198,407 B2
(45) Date of Patent: Dec. 14, 2021

(54) APPARATUS AND METHOD FOR DETERMINING ROLLOVER CONDITION OF VEHICLE

(71) Applicant: HYUNDAI MOBIS CO., LTD., Seoul (KR)

(72) Inventor: Sug Hyun Jeong, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 348 days.

(21) Appl. No.: 16/366,215

(22) Filed: Mar. 27, 2019

(65) Prior Publication Data

US 2019/0299892 A1    Oct. 3, 2019

(30) Foreign Application Priority Data

Mar. 27, 2018  (KR) .................. 10-2018-0034928

(51) Int. Cl.
| | | |
|---|---|---|
| *G01M 17/00* | (2006.01) | |
| *B60R 21/0132* | (2006.01) | |
| *B60W 40/114* | (2012.01) | |
| *B60W 40/11* | (2012.01) | |
| *B60W 40/112* | (2012.01) | |
| *B60R 21/00* | (2006.01) | |

(52) U.S. Cl.
CPC ......... *B60R 21/0132* (2013.01); *B60W 40/11* (2013.01); *B60W 40/112* (2013.01); *B60W 40/114* (2013.01); *B60R 2021/0018* (2013.01); *B60R 2021/01325* (2013.01); *B60W 2520/14* (2013.01); *B60W 2520/16* (2013.01); *B60W 2520/18* (2013.01)

(58) Field of Classification Search
CPC ........ B60R 21/0132; B60R 2021/0018; B60R 2021/01325; B60R 16/0233; B60W 40/114; B60W 40/11; B60W 40/112; B60W 2520/14; B60W 2520/16; B60W 2520/18; B60W 2520/125; G01M 17/00
USPC ...................................................... 701/29.1
See application file for complete search history.

(56) References Cited

U.S. PATENT DOCUMENTS 6,002,974 A * 12/1999 Schiffmann ............. B60R 21/01
180/252
6,002,975 A * 12/1999 Schiffmann ......... B60R 21/0132
180/282

(Continued)

*Primary Examiner* — Shardul D Patel
(74) *Attorney, Agent, or Firm* — NovoTechIP International PLLC

(57) ABSTRACT

An apparatus for determining a rollover condition of a vehicle may include: a rate sensing unit configured to sense one or more rates of a pitch rate PitchRate and a yaw rate YawRate of a vehicle and a roll rate RollRate_IN; an acceleration sensing unit configured to sense horizontal acceleration and vertical acceleration of the vehicle; a conversion unit configured to convert the horizontal acceleration and vertical acceleration into a pitch rate PitchRate_ACC and a yaw rate YawRate_ACC; a combination unit configured to calculate a pitch rate PitchRate_IN and a yaw rate YawRate_IN by combining the one or more rates with the pitch rate PitchRate_ACC and the yaw rate YawRate_ACC; and a determination unit configured to calculate a roll angle RollAngle, and determine whether the vehicle has rolled over, based on the roll rate RollRate_IN and the roll angle RollAngle.

17 Claims, 9 Drawing Sheets

(56) References Cited

U.S. PATENT DOCUMENTS

| | | | |
|---|---|---|---|
| 2004/0064236 A1* | 4/2004 | Lu | B60R 16/0233 |
| | | | 701/70 |
| 2004/0162654 A1* | 8/2004 | Lu | B60G 17/0162 |
| | | | 701/38 |
| 2004/0254707 A1* | 12/2004 | Lu | B60R 16/0233 |
| | | | 701/70 |
| 2005/0080543 A1* | 4/2005 | Lu | B60G 17/019 |
| | | | 701/70 |
| 2005/0189748 A1* | 9/2005 | Wu | B60N 2/427 |
| | | | 280/733 |
| 2005/0257981 A1* | 11/2005 | Iyoda | B60R 21/013 |
| | | | 180/282 |
| 2006/0058934 A1* | 3/2006 | Le | B60R 21/0132 |
| | | | 701/38 |
| 2008/0059021 A1* | 3/2008 | Lu | B60G 17/0195 |
| | | | 701/36 |
| 2009/0150021 A1* | 6/2009 | Le | B60R 21/0132 |
| | | | 701/45 |
| 2010/0191424 A1* | 7/2010 | Wellhoefer | B60R 21/0132 |
| | | | 701/45 |

* cited by examiner

APPARATUS AND METHOD FOR DETERMINING ROLLOVER CONDITION OF VEHICLE

CROSS-REFERENCES TO RELATED APPLICATIONS

The present application claims priority to Korean application number 10-2018-0034928, filed on Mar. 27, 2018, which is incorporated by reference in its entirety.

BACKGROUND OF THE INVENTION

The present invention relates to an apparatus and method for determining a rollover condition of a vehicle, and more particularly, to an apparatus and method for determining a rollover condition of a vehicle, which can determine whether a vehicle has rolled over, based on a roll rate and a roll angle of the vehicle.

In general, vehicles has an anti-lock brake system (ABS) installed therein in order to improve their stability. The ABS serves to prevent a brake lock by a slip on a slippery road, and enable a driver to steer during a braking operation. Furthermore, a traction control system (TCS) is generally installed to prevent a slip of the vehicle when a vehicle is started on a slippery road or lurches forward. Recently, an electronic stability program (ESP) system is installed to stably control the posture of a vehicle.

The recent increase in demand for sports utility vehicles (SUVs) or pick-up vehicles is raising the fatal accident rate. Since SUVs or pick-up vehicles have a center of gravity at a higher position than general sedan vehicles, SUVs or pick-up vehicles are exposed to the risk of a rollover accident. In reality, rollover accidents occupy a considerable portion of fatal traffic accidents. The ESP system determines a dangerous situation of the vehicle in a cornering limit region and properly controls the engine and the brake device, thereby preventing an accident. In particular, the ESP system can effectively prevent a rollover accident.

Therefore, in order to effectively implement an anti-rollover function, it is necessary to correctly determine a potential rollover situation in advance.

The conventional ESP system may determine a rollover condition of the vehicle through a method using a roll rate sensor or a method using only sensors mounted in the ESP system. Both of the two methods estimate and measure the roll angle and the roll rate of the vehicle, and recognize that the vehicle is likely to roll over, when the roll angle and the roll rate exceed preset reference values, respectively. That is, the methods determine a roll dynamic-related stable/unstable state of the vehicle, using values of sensors mounted in the vehicle.

The conventional ESP system determines a rollover condition of the vehicle by using the roll rate sensed by the roll rate sensor and the roll angle calculated by integrating the roll rate. At this time, the method for calculating the roll angle by integrating the roll rate has a problem in that the calculated roll angle has a large difference from an actual roll angle of the vehicle due to accumulation of sensor errors which occur while the vehicle is driving, for example, while the vehicle is turning. Thus, when the roll angle of the vehicle is misrecognized, a restraint device such as an airbag device may be unexpectedly deployed, thereby reducing the driving stability of the driver.

SUMMARY OF THE INVENTION

Embodiments of the present invention are directed to an apparatus and method for determining a rollover condition of a vehicle, which can remove the problem of the related art, in which the driving stability of a driver is reduced when a restraint device is unexpectedly deployed as a large difference occurs between an actual roll angle of a vehicle and an estimated roll angle due to error accumulation of a roll rate sensor, and thus improve calculation accuracy of the roll angle to precisely determine whether the vehicle has rolled over.

In one embodiment, an apparatus for determining a rollover condition of a vehicle may include: a rate sensing unit configured to sense one or more rates of a pitch rate PitchRate and a yaw rate YawRate of a vehicle and a roll rate RollRate_IN; an acceleration sensing unit configured to sense horizontal acceleration and vertical acceleration of the vehicle; a conversion unit configured to convert the horizontal acceleration and vertical acceleration sensed by the acceleration sensing unit into a pitch rate PitchRate_ACC and a yaw rate YawRate_ACC, respectively; a combination unit configured to calculate a pitch rate PitchRate_IN and a yaw rate YawRate_IN for following an actual roll angle of the vehicle by combining the one or more rates sensed by the rate sensing unit with the pitch rate PitchRate_ACC and yaw rate YawRate_ACC converted by the conversion unit; and a determination unit configured to calculate a roll angle RollAngle using the roll rate RollRate_IN, the pitch rate PitchRate_IN and the yaw rate YawRate_IN, and determine whether the vehicle has rolled over, based on the roll rate RollRate_IN and the roll angle RollAngle.

The determination unit may calculate the roll angle RollAngle by applying Euler angle conversion to the roll rate RollRate_IN, the pitch rate PitchRate_IN and the yaw rate YawRate_IN.

The conversion unit may correct the pitch rate PitchRate_ACC and the yaw rate YawRate_ACC based on the magnitudes of the converted pitch rate PitchRate_ACC and yaw rate YawRate_ACC and the magnitude of the roll angle RollAngle received from the determination unit.

The conversion unit may correct the pitch rate PitchRate_ACC to 0 when the magnitude of the pitch rate PitchRate_ACC is out of a first threshold range, correct the yaw rate YawRate_ACC to 0 when the magnitude of the yaw rate YawRate_ACC is out of a second threshold range, and correct both of the pitch rate PitchRate_ACC and the yaw rate YawRate_ACC to 0 when the magnitude of the roll angle RollAngle is out of a third threshold range.

The combination unit may receive a pitch angle PitchAngle calculated during an Euler angle conversion process by the determination unit from the determination unit, and calculate the pitch rate PitchRate_IN and the yaw rate YawRate_IN by adjusting the combination ratio of the pitch rate PitchRate sensed by the rate sensing unit to the pitch rate PitchRate_ACC converted by the conversion unit or the combination ratio of the yaw rate YawRate sensed by the rate sensing unit to the yaw rate YawRate_ACC converted by the conversion unit, according to the received pitch angle PitchAngle.

The combination unit may calculate the pitch rate PitchRate_IN as the pitch rate PitchRate_ACC converted by the conversion unit in one or more of the case that only the yaw rate YawRate is sensed by the rate sensing unit and the case that the pitch rate PitchRate sensed by the rate sensing unit is out of a corresponding expected range, and calculate the yaw rate YawRate_IN as the yaw rate YawRate_ACC converted by the conversion unit in one or more of the case that only the pitch rate PitchRate is sensed by the rate sensing unit and the case that the yaw rate YawRate sensed by the rate sensing unit is out of a corresponding expected range.

The combination unit may calculate the yaw rate YawRate_IN as the yaw rate YawRate sensed by the rate sensing unit, when it is determined that the horizontal acceleration sensed by the acceleration sensing unit is out of a corresponding expected range, and calculate the pitch rate PitchRate_IN and the yaw rate YawRate_IN as the pitch rate PitchRate and yaw rate YawRate sensed by the rate sensing unit, respectively, when it is determined that the vertical acceleration sensed by the acceleration sensing unit is out of a corresponding expected range.

When the roll rate RollRate_IN and the roll angle RollAngle are equal to or more than threshold values preset for the roll rate RollRate_IN and the roll angle RollAngle, respectively, the determination unit may determine that the vehicle has rolled over.

In another embodiment, a method for determining a rollover condition of a vehicle may include: sensing, an rate sensing unit, one or more rates of a pitch rate PitchRate and a yaw rate YawRate of a vehicle and a roll rate RollRate_IN; sensing, by an acceleration sensing unit, horizontal acceleration and vertical acceleration of the vehicle; converting, by a conversion unit, the horizontal acceleration and vertical acceleration sensed by the acceleration sensing unit into a pitch rate PitchRate_ACC and a yaw rate YawRate_ACC, respectively; calculating, by a combination unit, a pitch rate PitchRate_IN and a yaw rate YawRate_IN for following an actual roll angle of the vehicle by combining the one or more rates sensed by the rate sensing unit with the pitch rate PitchRate_ACC and yaw rate YawRate_ACC converted by the conversion unit; and calculating, by a determination unit, a roll angle RollAngle using the roll rate RollRate_IN, the pitch rate PitchRate_IN and the yaw rate YawRate_IN, and determining whether the vehicle has rolled over, based on the roll rate RollRate_IN and the roll angle RollAngle.

In another embodiment, an apparatus for determining a rollover condition of a vehicle may include: a rate sensing unit configured to sense a roll rate RollRate_IN of a vehicle; an acceleration sensing unit configured to sense horizontal acceleration and vertical acceleration of the vehicle; a conversion unit configured to convert the horizontal acceleration and vertical acceleration sensed by the acceleration sensing unit into a pitch rate PitchRate_ACC and a yaw rate YawRate_ACC; and a determination unit configured to calculate a roll angle RollAngle using the roll rate RollRate_IN, the pitch rate PitchRate_ACC and the yaw rate YawRate_ACC, and determine whether the vehicle has rolled over, based on the roll rate RollRate_IN and the roll angle RollAngle.

In accordance with the embodiments of the present invention, the apparatus and method for determining a rollover condition of a vehicle can calculate the roll angle into which an actual roll angle of the vehicle is reflected, by calculating the roll angle through the process of combining the rates sensed by the rate sensors with the rates converted from the accelerations sensed by the acceleration sensors, thereby improving the accuracy of the roll angle calculation. Therefore, the apparatus and method can precisely determine a rollover condition of the vehicle, thereby preventing degradation in driving stability of a driver, which may occur when a restraint device such as an airbag is unexpectedly deployed.

DESCRIPTION OF SPECIFIC EMBODIMENTS

Hereafter, an apparatus and method for determining a rollover condition of a vehicle in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
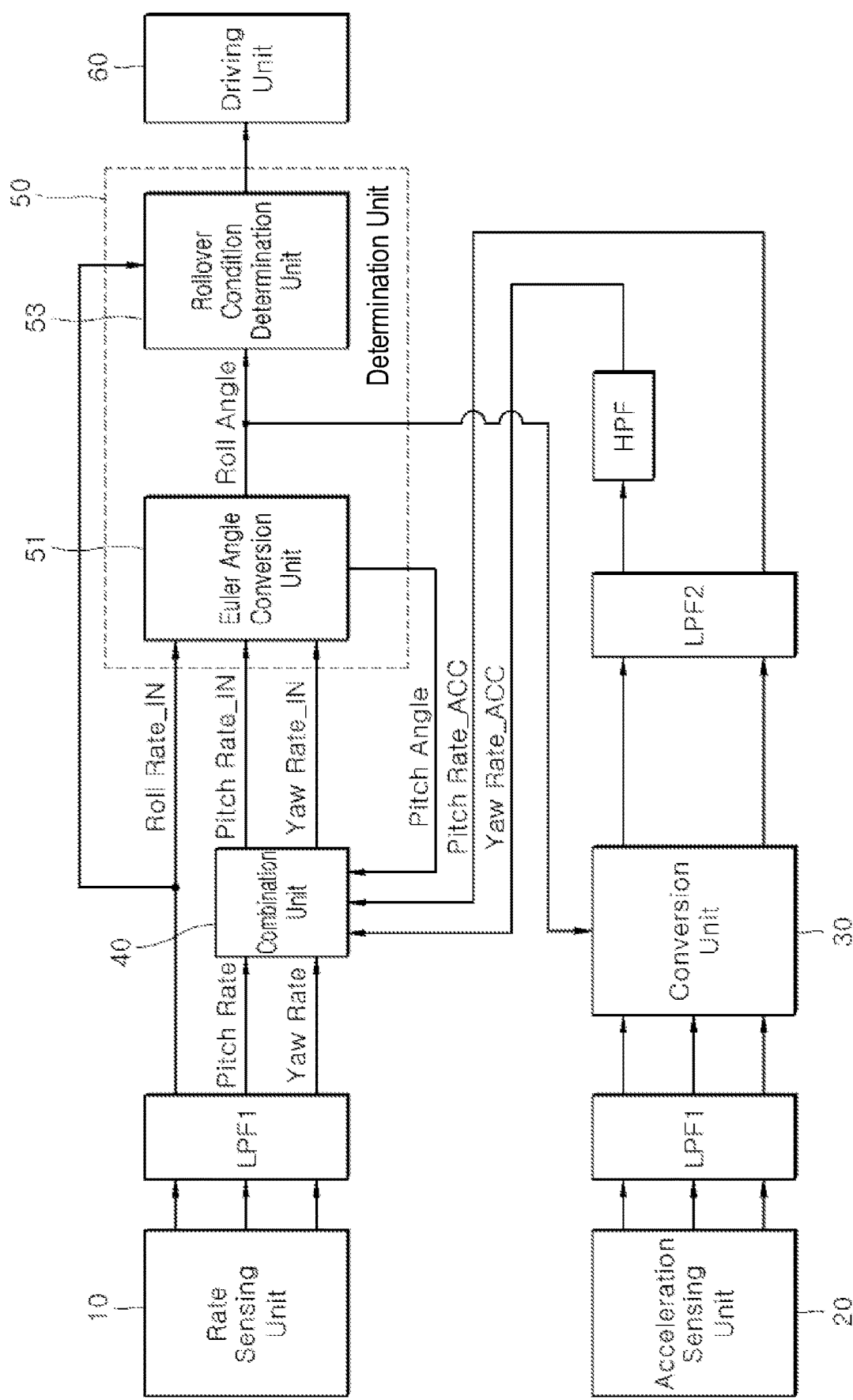
FIG. 1 is a block diagram illustrating an apparatus for determining a rollover condition of a vehicle in accordance with an embodiment of the present invention.

FIG. 1 is a block diagram illustrating an apparatus for determining a rollover condition of a vehicle in accordance with an embodiment of the present invention, and FIGS. 2 to 8 are experimental data showing that a roll angle and a roll rate which are calculated through the apparatus for determining a rollover condition of a vehicle in accordance with the embodiment of the present invention can precisely follow an actual roll angle and roll rate of the vehicle.

Referring to FIG. 1, the apparatus for a rollover condition of a vehicle in accordance with the embodiment of the present invention may include a rate sensing unit 10, an acceleration sensing unit 20, a conversion unit 30, a combination unit 40, a determination unit 50 and a driving unit 60. The determination unit 50 may include an Euler angle conversion unit 51 and a rollover condition determination unit 53.

The rate sensing unit 10 may sense one or more of a pitch rate PitchRate and a yaw rate YawRate of the vehicle, and sense a roll rate RollRate_IN. The roll rate may indicate a rotational rate about the longitudinal axis (x-axis) of the vehicle, the pitch rate may indicate a rotational rate about the horizontal axis (y-axis) of the vehicle, and the yaw rate may indicate a rotational rate about the vertical axis (z-axis) of the vehicle. The rate sensing unit 10 may include a pitch rate sensor and a yaw rate sensor to sense one or more of the pitch rate PitchRate and the yaw rate YawRate of the vehicle, and include a roll rate sensor to sense the roll rate RollRate_IN. The rate sensing unit 10 may include all of the pitch rate PitchRate, the yaw rate YawRate and the roll rate RollRate_IN. For this configuration, the rate sensing unit 10 may include a three-axis rate sensor such as a gyro-sensor.

The acceleration sensing unit 20 may sense horizontal acceleration (y-axis acceleration) and vertical acceleration (z-axis acceleration) of the vehicle. The acceleration sensing unit 20 may include a horizontal acceleration sensor and a vertical acceleration sensor to sense the horizontal acceleration and the vertical acceleration or include a two-axis acceleration sensor. The acceleration sensing unit 20 may also sense longitudinal acceleration (x-axis acceleration) as well as the horizontal acceleration and the vertical acceleration. In this case, the acceleration sensing unit 20 may include a horizontal acceleration sensor, a vertical acceleration sensor and a longitudinal acceleration sensor to sense the horizontal acceleration, the vertical acceleration and the longitudinal acceleration, or include a three-axis acceleration sensor.

As illustrated in FIG. 1, the rates sensed by the rate sensing unit 10 and the accelerations sensed by the acceleration sensing unit 20 may be subjected to a preprocessing process by a low-pass filter. This process will be described below.

The conversion unit 30 may convert the horizontal acceleration and the vertical acceleration, which are sensed by the acceleration sensing unit 20, into a pitch rate PitchRate_ACC and a yaw rate YawRate_ACC, respectively. The combination unit 40 may calculate a pitch rate PitchRate_IN and a yaw rate YawRate_IN for following an actual roll angle of the vehicle, by combining one or more rates sensed by the rate sensing unit 10 with the pitch rate PitchRate_ACC and the yaw rate YawRate_ACC which are converted by the conversion unit 30. The combining may include the meaning of selecting. The operations of the conversion unit 30 and the combination unit 40 will be described below in detail.

The determination unit 50 may calculate a roll angle RollAngle using the roll rate RollRate_IN, the pitch rate PitchRate_IN and the yaw rate YawRate_IN, and determine a rollover condition of the vehicle based on the roll rate RollRate_IN and the roll angle RollAngle. Referring to FIG. 1, the determination unit 50 may include the Euler angle conversion unit 51 and the rollover condition determination unit 53. The Euler angle conversion unit 51 may calculate the roll angle RollAngle by applying Euler angle conversion to the roll rate RollRate_IN, the pitch rate PitchRate_IN and the yaw rate YawRate_IN, and the rollover condition determination unit 53 may determine that the vehicle has rolled over, when the roll rate RollRate_IN and the roll angle RollAngle are equal to or more than threshold values which are set for the roll rate RollRate_IN and the roll angle RollAngle, respectively.

Based on the above-described configuration, the operation of the apparatus for determining a rollover condition of a vehicle in accordance with the embodiment of the present invention will be described in detail.

The Euler angle conversion performed by the Euler angle conversion unit 51 of the determination unit 50 may be generally performed according to Equation 1 below.

$$G(\Omega, Q) = \begin{bmatrix} p + (q\sin\phi + r\cos\phi)\tan\theta \\ q\cos\phi - r\sin\phi \\ (q\sin\phi + r\cos\phi)\sec\theta \end{bmatrix} \quad \text{[Equation 1]}$$

In Equation 1, $\Omega$ represents a roll rate p, a pitch rate q and a yaw rate r, and Q represents a current Euler angle (roll angle $\phi$, pitch angle $\theta$ and yaw angle $\psi$).

The Euler angle based on Equation 1 may effectively follow the actual roll angle of the vehicle, when the value of a rate sensed by the rate sensing unit 10 falls within a normal range. However, when the value of the rate sensed by the rate sensing unit 10 has a certain error, the Euler angle may not correctly follow the actual roll angle of the vehicle. For example, as indicated by Equation 1, when the value of the pitch rate sensed by the rate sensing unit 10 has an error due to the influence of disturbance, sensor offset or the like such that a pitch angle generated by integrating the pitch rate increases to approach 90°, a term of tan $\theta$ may diverge. In this case, the Euler angle cannot follow the actual roll angle of the vehicle.

Figure 2:
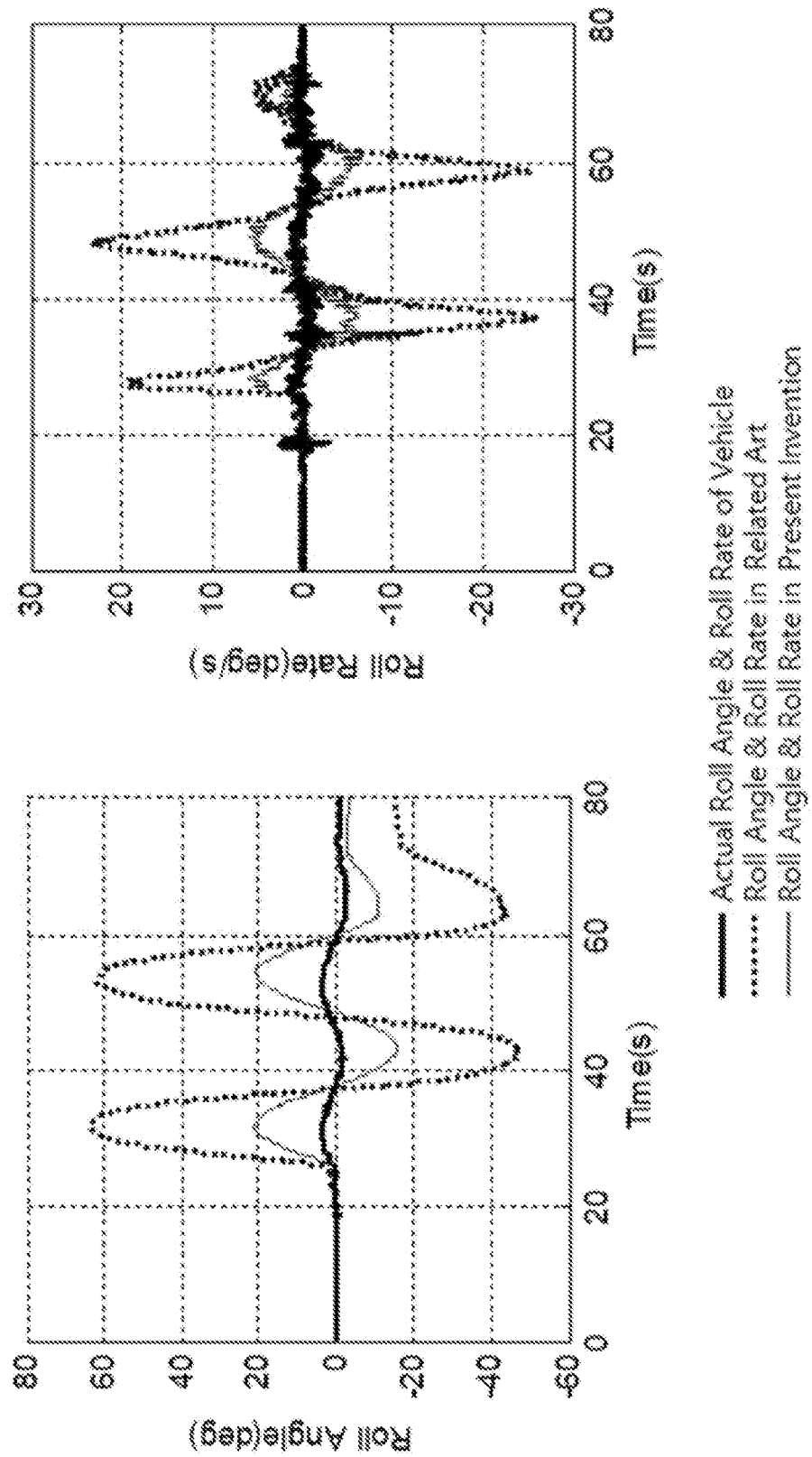
FIGS. 2 to 8 are graphs illustrating experimental data showing that a roll angle and a roll rate which are calculated through the apparatus for determining a rollover condition of a vehicle in accordance with the embodiment of the present invention can precisely follow an actual roll angle and roll rate of the vehicle.

Thus, in the present embodiment, the horizontal acceleration and the vertical acceleration, sensed by the acceleration sensing unit 20, may be converted into the pitch rate and the yaw rate, and the pitch rate and the yaw rate may be combined with one or more rates sensed by the rate sensing unit 10. Then, the Euler angle conversion unit 51 may perform Euler angle conversion to remove the problem that the Euler angle cannot follow the actual roll angle of the vehicle due to a sensor error, offset or the like. That is, as illustrated in FIG. 2, the apparatus in accordance with the present embodiment can remove the existing problem that the roll angle and the roll rate diverge, such that the roll angle and the roll rate can follow the actual roll angle and the actual roll rate of the vehicle.

In order to describe the aforementioned configuration in detail, the operation of the conversion unit 30 will be first described.

As described above, the conversion unit 30 may convert the horizontal acceleration and the vertical acceleration, which are sensed by the acceleration sensing unit 20, into a pitch rate PitchRate_ACC and a yaw rate YawRate_ACC, respectively. Furthermore, when longitudinal acceleration as well as the horizontal acceleration and the vertical acceleration is sensed by the acceleration sensing unit 20, the conversion unit 30 may convert the horizontal acceleration, the vertical acceleration and the longitudinal acceleration into the pitch rate PitchRate_ACC and the yaw rate YawRate_ACC.

That is, when the acceleration sensing unit 20 includes a three-axis acceleration sensor to sense the horizontal acceleration, the vertical acceleration and the longitudinal acceleration, the conversion unit 30 may convert the horizontal acceleration, the vertical acceleration and the longitudinal acceleration into the pitch rate PitchRate_ACC and the yaw rate YawRate_ACC. When the longitudinal acceleration does not fall within a normal range due to a breakdown of the longitudinal acceleration sensor or the acceleration sensing unit 20 includes only a two-axis acceleration sensor, the conversion unit 30 may perform conversion into the pitch rate PitchRate_ACC and the yaw rate YawRate_ACC using only the horizontal acceleration and the vertical acceleration.

The pitch rate PitchRate_ACC and the yaw rate YawRate_ACC may be calculated according to Equation 2 below, which converts an acceleration value into an Euler angle.

$$\text{PitchRate\_ACC} = \quad \text{[Equation 2]}$$
$$atan\left\{\frac{Z\_ACC}{\sqrt{X\_ACC^2 + (Z\_ACC + 1)^2}}\right\} * \frac{180}{\pi}$$

$$\text{YawRate\_ACC} =$$
$$atan\left\{\frac{Y\_ACC}{\sqrt{X\_ACC^2 + (Z\_ACC + 1)^2}}\right\} * \frac{180}{\pi}$$

In Equation 2, X_ACC represents longitudinal acceleration, Y_ACC represents longitudinal acceleration, and Z_ACC represents vertical acceleration. Equation 2 may indicate an expression for converting the horizontal acceleration, the vertical acceleration and the longitudinal acceleration into the pitch rate PitchRate_ACC and the yaw rate YawRate_ACC. When the longitudinal acceleration does not fall within a normal range due to a breakdown of the longitudinal sensor or the acceleration sensing unit 20 includes only a two-axis acceleration sensor, the conversion unit 30 may calculate the pitch rate PitchRate_ACC and the yaw rate YawRate_ACC according to Equation 3 below.

$$PitchRate\_ACC = a\tan\left\{\frac{Z\_ACC}{(Z\_ACC+1)}\right\} * \frac{180}{\pi}$$

$$YawRate\_ACC = a\tan\left\{\frac{Y\_ACC}{(Z\_ACC+1)}\right\} * \frac{180}{\pi}$$

[Equation 3]

The conversion unit 30 may correct the pitch rate PitchRate_ACC and the yaw rate YawRate_ACC based on the magnitudes of the pitch rate PitchRate_ACC and the yaw rate YawRate_ACC, which are obtained by Equation 2 or 3, and the magnitude of the roll angle RollAngle received from the determination unit 50.

Specifically, when the magnitudes of the pitch rate PitchRate_ACC and the yaw rate YawRate_ACC are equal to or more than upper limit threshold values which are set for the pitch rate PitchRate_ACC and the yaw rate YawRate_ACC, respectively, the roll angle may diverge while the pitch rate PitchRate_ACC increases. In this case, the roll angle calculated by the determination unit 50 may not follow the actual roll angle of the vehicle. Therefore, a pitch rate PitchRate_ACC and a yaw rate YawRate_ACC, each of which has a magnitude equal to or more than the corresponding upper limit threshold value, need to be removed. Furthermore, even when it is determined that the pitch rate PitchRate_ACC and the yaw rate YawRate_ACC are in a dead zone because the magnitudes of the pitch rate PitchRate_ACC and the yaw rate YawRate_ACC are equal to or less than lower limit threshold values set for the pitch rate PitchRate_ACC and the yaw rate YawRate_ACC, respectively, the pitch rate PitchRate_ACC and the yaw rate YawRate_ACC need to be removed. Furthermore, even when the roll angle RollAngle received from the determination unit 50 has a magnitude equal to or more than the upper limit threshold value, the pitch rate PitchRate_ACC and the yaw rate YawRate_ACC need to be removed.

That is, the conversion unit 30 may correct the pitch rate PitchRate_ACC to 0 when the magnitude of the pitch rate PitchRate_ACC is out of a first threshold range, correct the yaw rate YawRate_ACC to 0 when the magnitude of the yaw rate YawRate_ACC is out of a second threshold range, and correct both of the pitch rate PitchRate_ACC and the yaw rate YawRate_ACC to 0 when the magnitude of the roll angle RollAngle is out of a third threshold range.

The first threshold range may be previously set to a range larger than PitchRate_DeadZone and smaller than PitchRate_Limit, and PitchRate_DeadZone and PitchRate_Limit may be selected as various tuning parameters based on a designer's intention and experimental results, and preset in the conversion unit 30. For example, PitchRate_DeadZone may range from 0 to 15 deg/sec, and PitchRate_Limit may range from 20 to 40 deg/sec. The second threshold range may be preset to a range larger than YawRate_DeadZone and smaller than YawRate_Limit, and YawRate_DeadZone and YawRate_Limit may be selected as various tuning parameters based on a designer's intention and experimental results, and preset in the conversion unit 30. For example, YawRate_DeadZone may range from 0 to 15 deg/sec, and YawRate_Limit may range from 40 to 70 deg/sec. The third threshold range may be set to a range smaller than RollAngle_Limit, and RollAngle_Limit may be selected as various tuning parameters based on a designer's intention and experimental results, and preset in the conversion unit 30. For example, RollAngle_Limit may range from 15 to 30 deg.

The combination unit 40 may calculate the pitch rate PitchRate_IN and the yaw rate YawRate_IN for following the actual roll angle of the vehicle, by combining one or more of the pitch rate PitchRate and the yaw rate YawRate, sensed by the rate sensing unit 10, with the pitch rate PitchRate_ACC and the yaw rate YawRate_ACC which are converted by the conversion unit 30.

As described above, when the value of the pitch rate sensed by the rate sensing unit 10 has an error due to the influence of disturbance, sensor offset or the like such that the pitch angle generated by integrating the pitch rate increases to approach 90°, the roll angle may not follow the actual roll angle of the vehicle because the term of tan θ diverges. Thus, in the present embodiment, the combination unit 40 may combine the pitch rate PitchRate_ACC and the yaw rate YawRate_ACC which are converted from the accelerations with one or more of the pitch rate PitchRate and the yaw rate YawRate which are sensed by the rate sensing unit 10, thereby removing the problem that the roll angle cannot follow the actual angle of the vehicle due to the influence of a sensor error and offset.

At this time, the combination unit 40 may receive the pitch angle PitchAngle which is calculated during the Euler angle conversion process by the determination unit 50, and calculate the pitch rate PitchRate_IN and the yaw rate YawRate_IN by adjusting the combination ratio of the pitch rate PitchRate sensed by the rate sensing unit 10 to the pitch rate PitchRate_ACC converted by the conversion unit 30 or the combination ratio of the yaw rate YawRate sensed by the rate sensing unit 10 to the yaw rate YawRate_ACC converted by the conversion unit 30, according to the received pitch angle PitchAngle.

The pitch rate PitchRate_IN and the yaw rate YawRate_IN may be calculated according to Equation 4 below.

PitchRate_IN=PitchRate_ACC*|PitchAngle*G|+
    PitchRate*(1−|PitchAngle*G|)

YawRate_IN=YawRate_ACC**|PitchAngle*G|+
    YawRate*(1−|PitchAngle*G|)  [Equation 4]

The pitch angle PitchAngle which is fed back from the determination unit 50 and expressed in Equation 4 may have a value which is saturated to ±±1 as a radian unit, and the absolute value of the pitch angle PitchAngle multiplied by a predetermined gain G may be taken. Here, the gain G may be selected as various tuning parameters based on a designer's intention and experimental results, and preset in the conversion unit 30. For example, the gain G may range from 4 to 10.

In the present embodiment, the rate sensing unit 10 may include only any one sensor of the pitch rate sensor and the yaw rate sensor. That is, the rate sensing unit 10 may sense any one rate of the pitch rate and the yaw rate. For example, a low-price vehicle may include only any one of the pitch rate sensor and the yaw rate sensor. Furthermore, it may be determined that the rate or the acceleration is out of an expected range in which the rate or the acceleration is expected to be inputted in a normal state, due to an abnormal operation of the rate sensing unit 10 or the acceleration sensing unit 20 (for example, a breakdown of a rate sensor or acceleration sensor). In this case, fail-safe logic may be required, and the method in which the combination unit 40 calculates the pitch rate PitchRate_IN and the yaw rate YawRate_IN will be described in detail for each case.

First, in one or more of the case that only the yaw rate YawRate is sensed by the rate sensing unit 10 (for example, the absence of the pitch rate sensor) and the case that it is determined that the pitch rate PitchRate sensed by the rate sensing unit 10 is out of the corresponding expected range (for example, a breakdown of the pitch rate sensor), the pitch rate PitchRate sensed by the rate sensing unit 10 cannot be considered. Thus, the combination unit 40 may calculate the pitch rate PitchRate_IN as the pitch rate PitchRate_ACC converted by the conversion unit 30.

Furthermore, in one or more of the case that only the pitch rate PitchRate is sensed by the rate sensing unit 10 (for example, the absence of the yaw rate sensor) and the case that it is determined that the yaw rate YawRate sensed by the rate sensing unit 10 is out of the corresponding expected range (for example, a breakdown of the yaw rate sensor), the yaw rate YawRate sensed by the rate sensing unit 10 cannot be considered. Thus, the combination unit 40 may calculate the yaw rate YawRate_IN as the yaw rate YawRate_ACC converted by the conversion unit 30.

When it is determined that the horizontal acceleration sensed by the acceleration sensing unit 20 is out of the corresponding expected range (for example, a breakdown of the horizontal acceleration sensor), a normal rate YawRate_ACC cannot be calculated according to Equation 2 or 3. Thus, the combination unit 40 may calculate the yaw rate YawRate_IN as the yaw rate YawRate sensed by the rate sensing unit 10. This case is based on the supposition that the yaw rate YawRate is sensed by the sensing unit 10.

When it is determined that the vertical acceleration sensed by the acceleration sensing unit 20 is out of the corresponding expected range, a normal pitch rate PitchRate_ACC and yaw rate YawRate_ACC cannot be calculated according to Equation 2 or 3. Thus, the combination unit 40 may calculate the pitch rate PitchRate_IN and the yaw rate YawRate_IN as the pitch rate PitchRate and the yaw rate YawRate which are sensed by the rate sensing unit 10, respectively. This case is based on the supposition that both of the pitch rate PitchRate and the yaw rate YawRate are sensed by the sensing unit 10.

The determination unit 50 may calculate the roll angle RollAngle using the roll rate RollRate_IN, the pitch rate PitchRate_IN and the yaw rate YawRate_IN, and determine whether the vehicle has rolled over, based on the roll rate RollRate_IN and the roll angle RollAngle.

This operation will be described in detail through the sub components of the determination unit 50. The Euler angle conversion unit 51 may perform Euler angle conversion on the roll rate RollRate_IN, the pitch rate PitchRate_IN and the yaw rate YawRate_IN, and the Euler angle conversion process may be expressed as Equation 5 below.

RollRate_out=RollRAte_IN+{PitchRate_IN*sin(RollAngle)+YawRate_IN*cos(RollAngle)}*tan(PitchAngle)

PitchRate_out=PitchRate_IN*cos(RollAngle)−YawRate_IN*sin(RollAngle)   [Equation 5]

RollAngle=ΣRollRate_out

PitchAngle=ΣPitchRate_out

In Equation 5, RollRate_out and PitchRate_out represent internal variables used in the Euler angle conversion process.

The roll angle RollAngle calculated through Equation 5 may be provided to the rollover condition determination unit 53 and simultaneously fed back to the conversion unit 30 to correct the pitch rate PitchRate_ACC and the yaw rate YawRate_ACC. Furthermore, the pitch angle PitchAngle calculated through Equation 5 may be fed back to the combination unit 40 to adjust the combination ratio of the pitch rate PitchRate sensed by the rate sensing unit 10 to the pitch rate PitchRate_ACC converted by the conversion unit 30 or the combination ratio of the yaw rate YawRate sensed by the rate sensing unit 10 to the yaw rate YawRate_ACC converted by the conversion unit 30.

The rollover condition determination unit 53 may determine that the vehicle has rolled over, when the roll rate RollRate_IN and the roll angle RollAngle are equal to or more that the threshold values set for the roll rate RollRate_IN and the roll angle RollAngle, respectively. The threshold values set for the roll rate RollRate_IN and the roll angle RollAngle may be designed in various manners based on a designer's intention and experimental results, and preset in the rollover condition determination unit 53.

When the rollover condition determination unit 53 determines that the vehicle has rolled over, the driving unit 60 may drive a restraint device such as a side airbag or curtain airbag.

In the present embodiment, the rates sensed by the rate sensing unit 10 and the accelerations sensed by the acceleration sensing unit 20 may be subjected to the preprocessing process by a low pass filter LPF1, and the low pass filter LPF1 may have a cutoff frequency of 50 Hz or less. However, the present invention is not limited thereto. Furthermore, the rates converted by the conversion unit 30 may also be subjected to a preprocessing process by a low pass filter LPF2 for filtering the rates PitchRate_ACC and YawRate_ACC and a high pass filter HPF for filtering the rate PitchRate_ACC, and the high pass filter HPF may have a cutoff frequency of 0.01 to 0.03 Hz. However, the present invention is not limited thereto.

Figure 3:
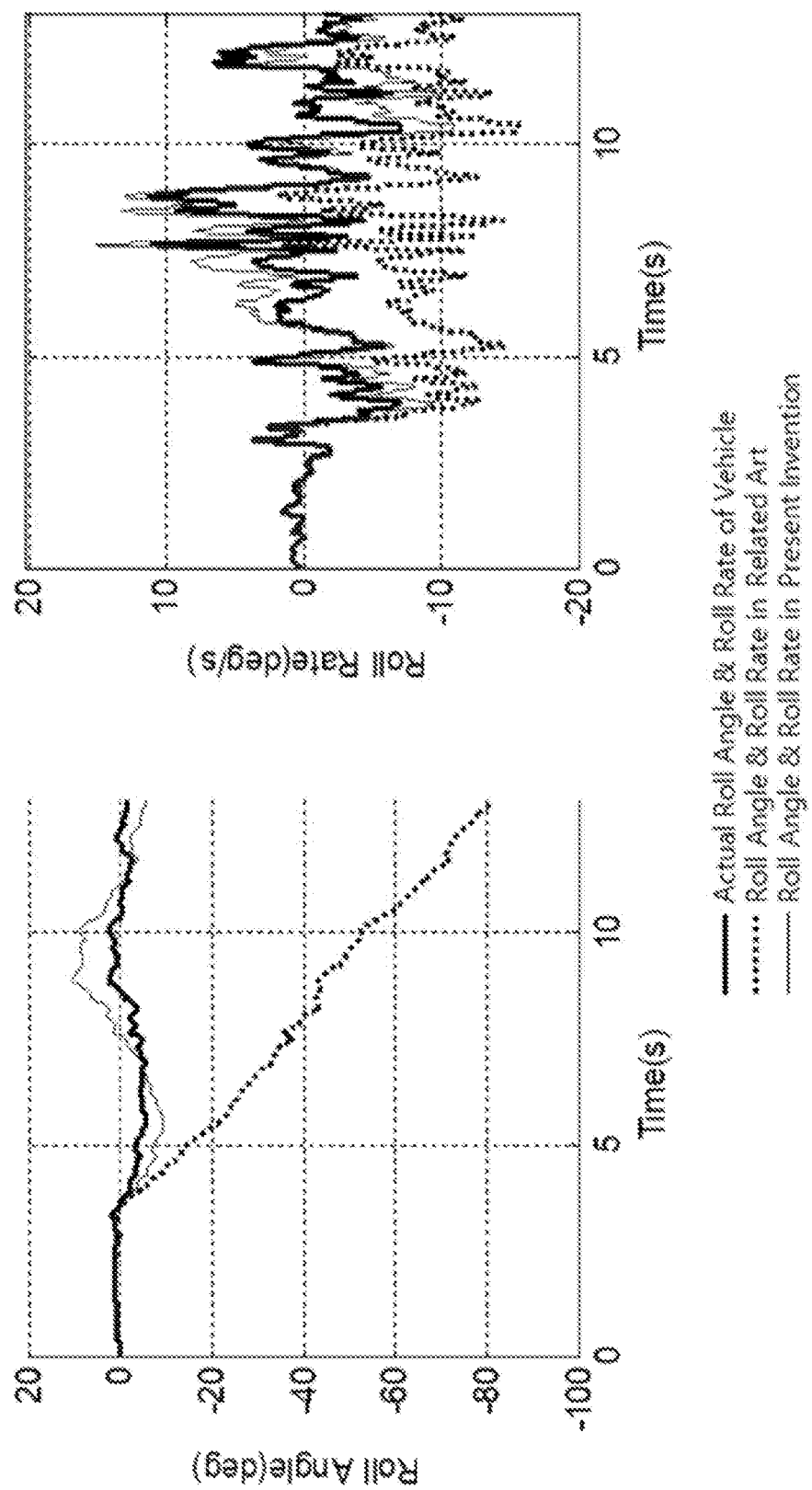
Figure 4:
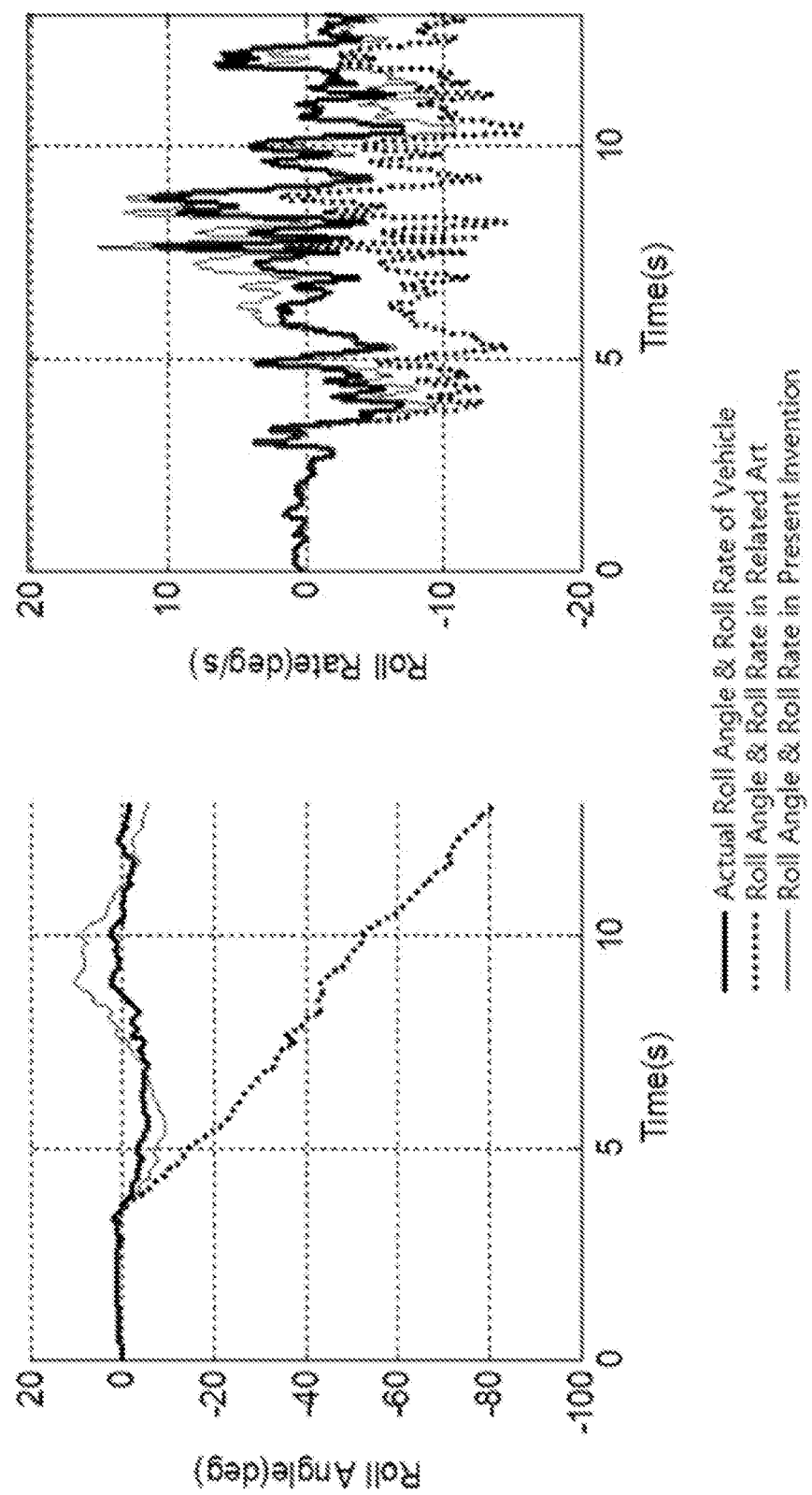
Figure 5:
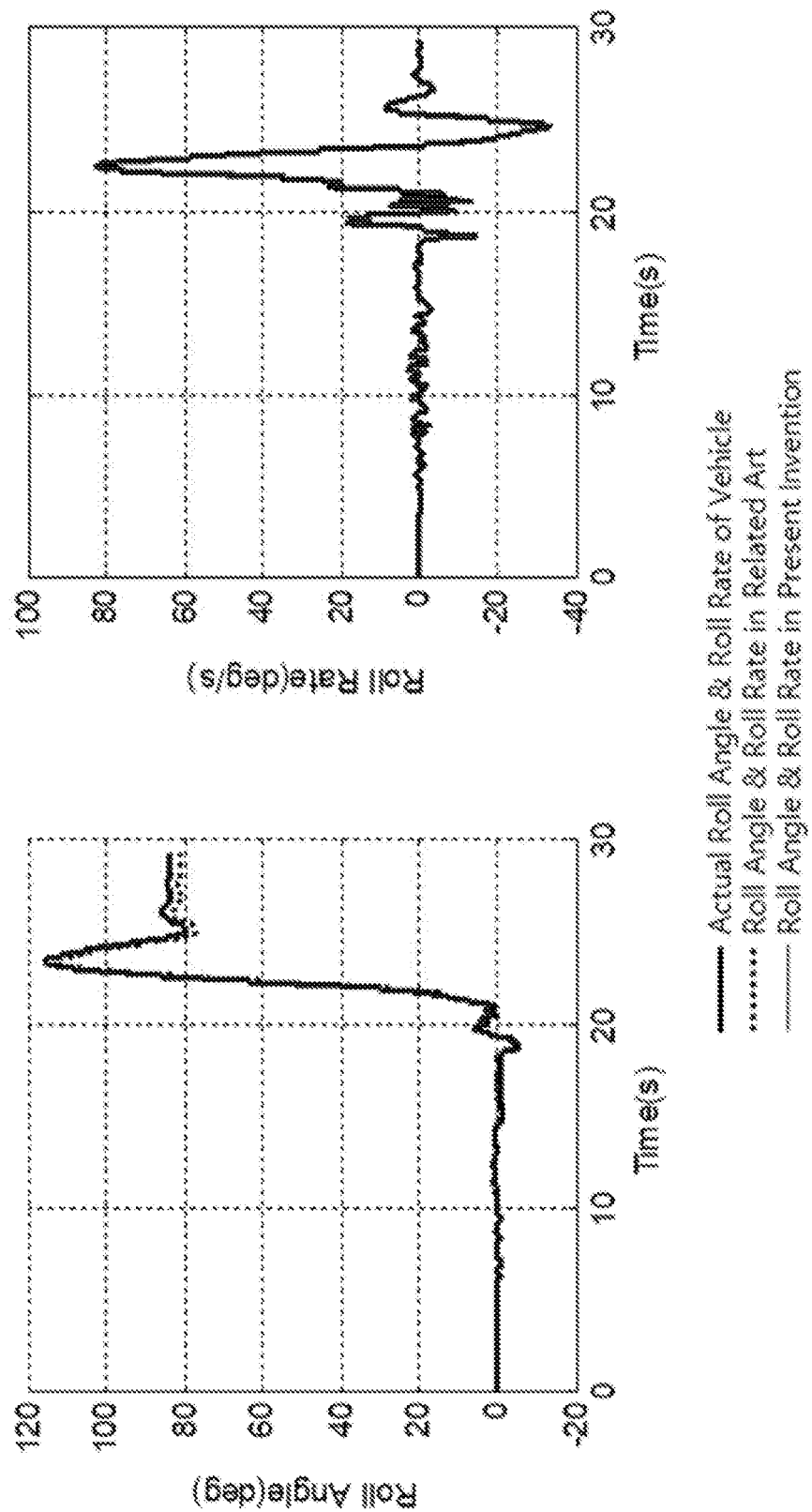

FIGS. 3 to 5 are graphs illustrating experimental data showing that, when both of the rate sensing unit 10 and the acceleration sensing unit 20 normally sense rates and accelerations, a roll angle and a roll rate can precisely follow an actual roll angle and roll rate of the vehicle. FIG. 3 shows that the problem that the roll angle diverges due to error accumulation of the roll rate sensor is removed. FIG. 4 shows a roll angle and roll rate$_{[u]}$ when the vehicle is likely to roll over (for example, a rollover angle of about 40°) in such a range that the restraint device of the vehicle is not driven by the driving unit 60, and FIG. 5 shows a roll angle and roll rate when the restraint device of the vehicle is driven by the driving unit 60 because the vehicle has rolled over (for example, a rollover angle of about 110°). FIGS. 4 and 5 show that the roll angle and the roll rate in accordance with the present embodiment is effectively following the actual roll angle and roll rate of the vehicle.

Figure 6:
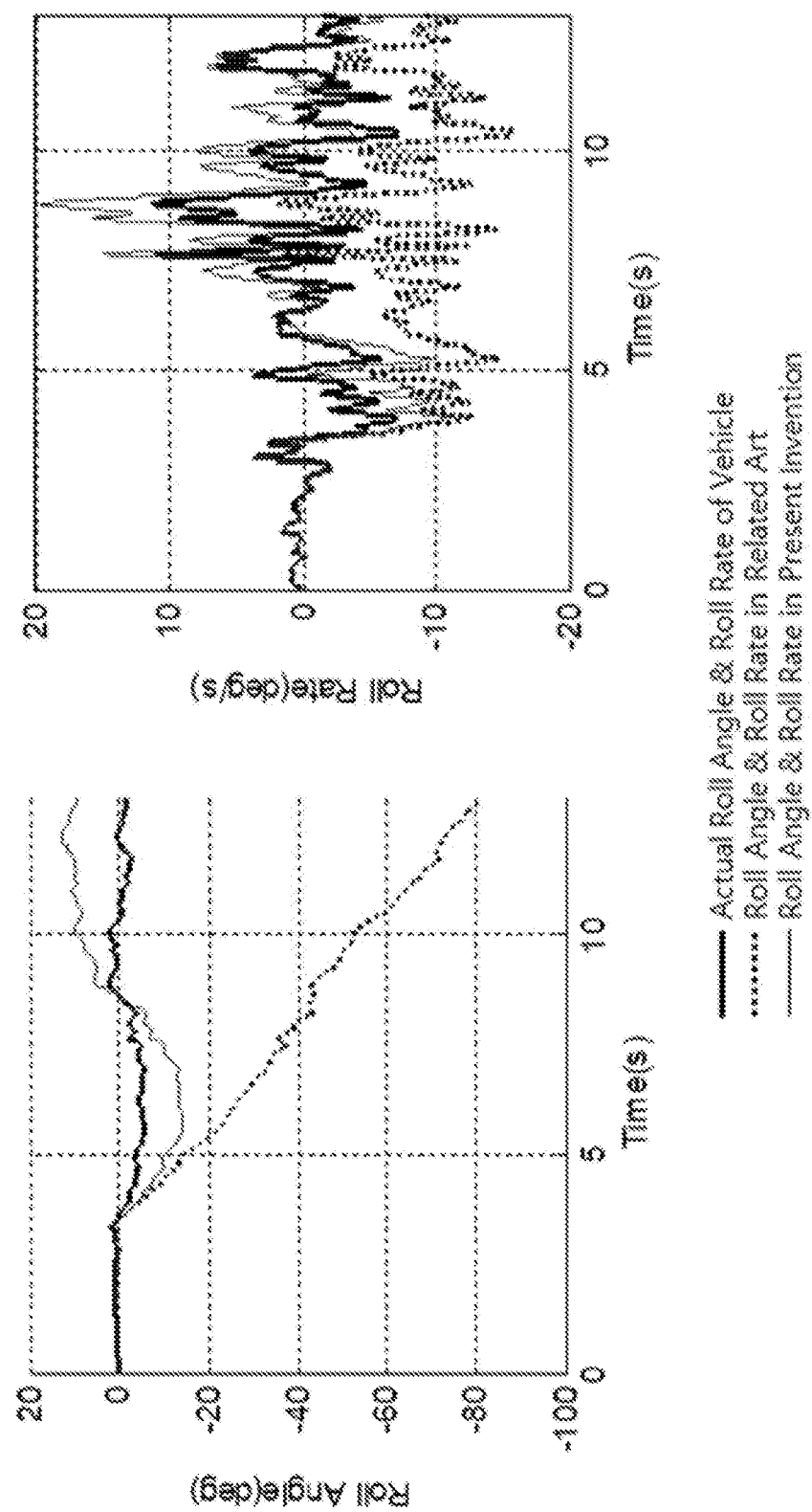
Figure 7:
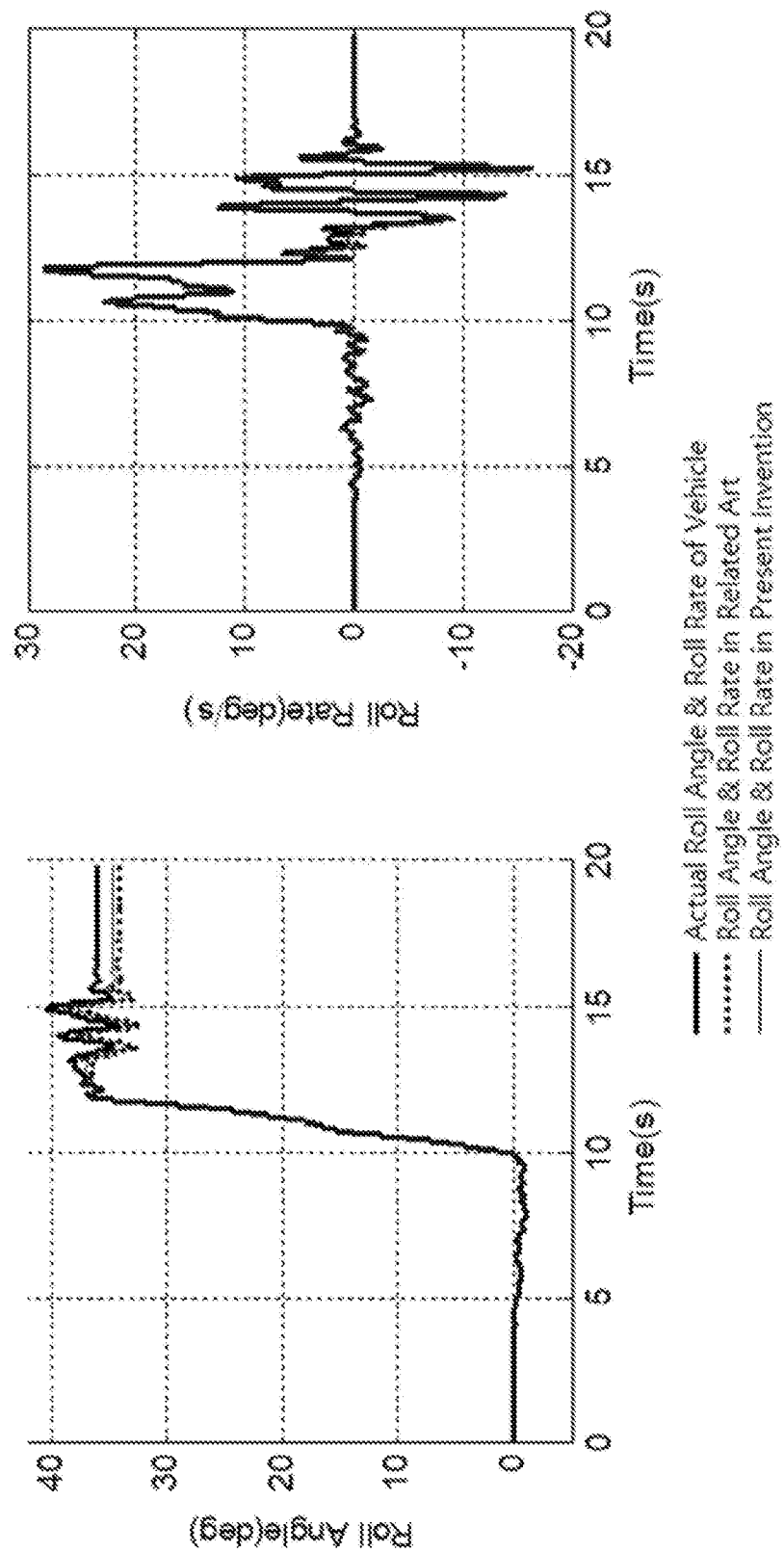
Figure 8:
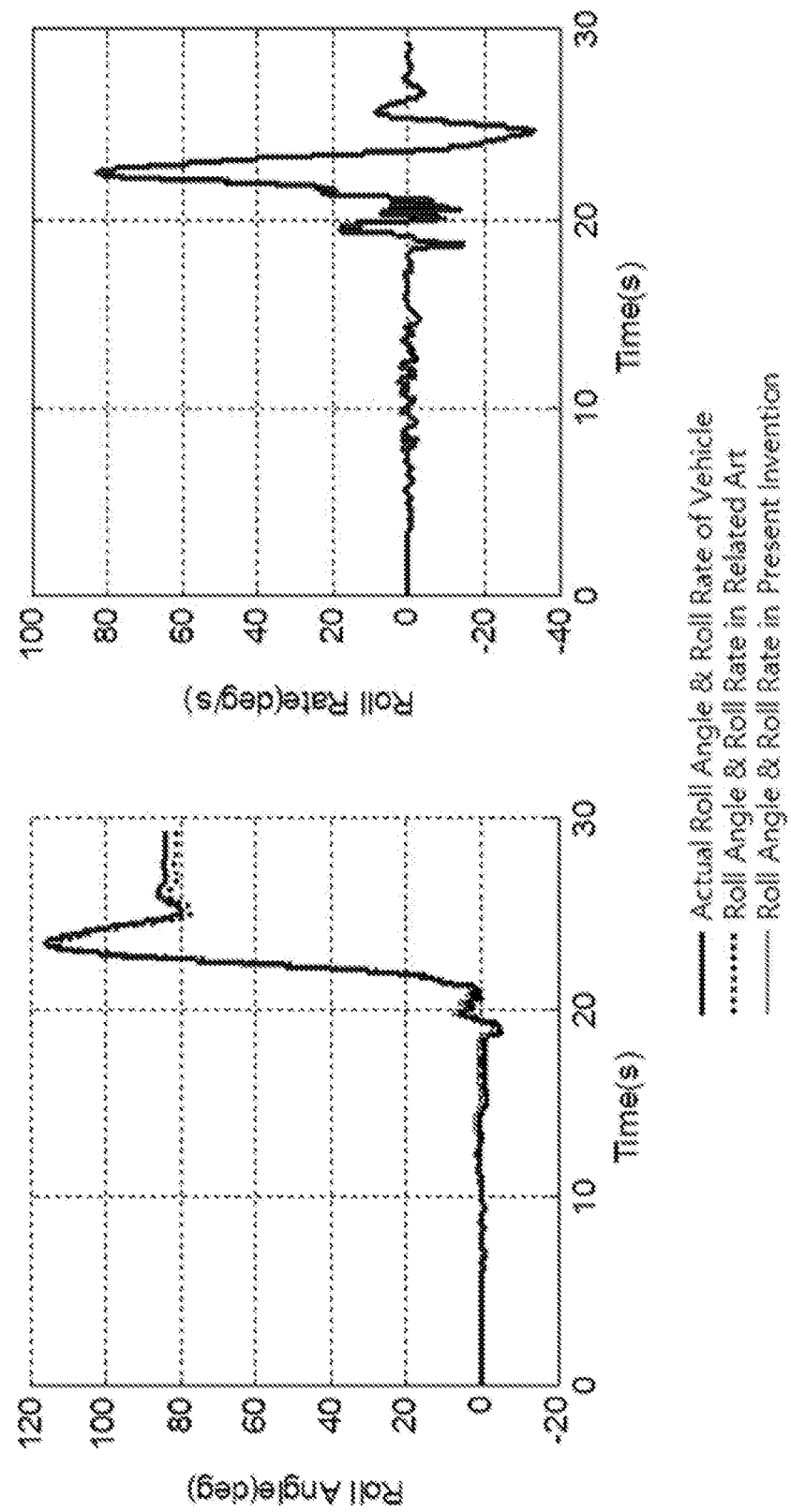

FIGS. 6 to 8 are graphs illustrating experimental data showing that, even when the fail-safe function of the combination unit 50 is performed because the pitch rate sensor and the yaw rate sensor broke down, the roll angle and the roll rate in accordance with the present embodiment can precisely follow the actual roll angle and roll rate of the vehicle. FIG. 6 shows that the problem that the roll angle diverges due to error accumulation of the roll rate sensor is removed. FIG. 7 shows a roll angle and roll rate$_{[u2]}$ when the vehicle is likely to roll over (for example, a rollover angle of about 40°) in such a range that the restraint device of the vehicle is not driven by the driving unit 60, and FIG. 8 shows a roll angle and roll rate$_{[u3]}$ when the restraint device of the vehicle is driven by the driving unit 60 because the vehicle has rolled over (for example, a rollover angle of about 110°). FIGS. 7 and 8 show that the roll angle and the roll rate in accordance with the present embodiment are effectively following the actual roll angle and roll rate of the vehicle.

Figure 9:
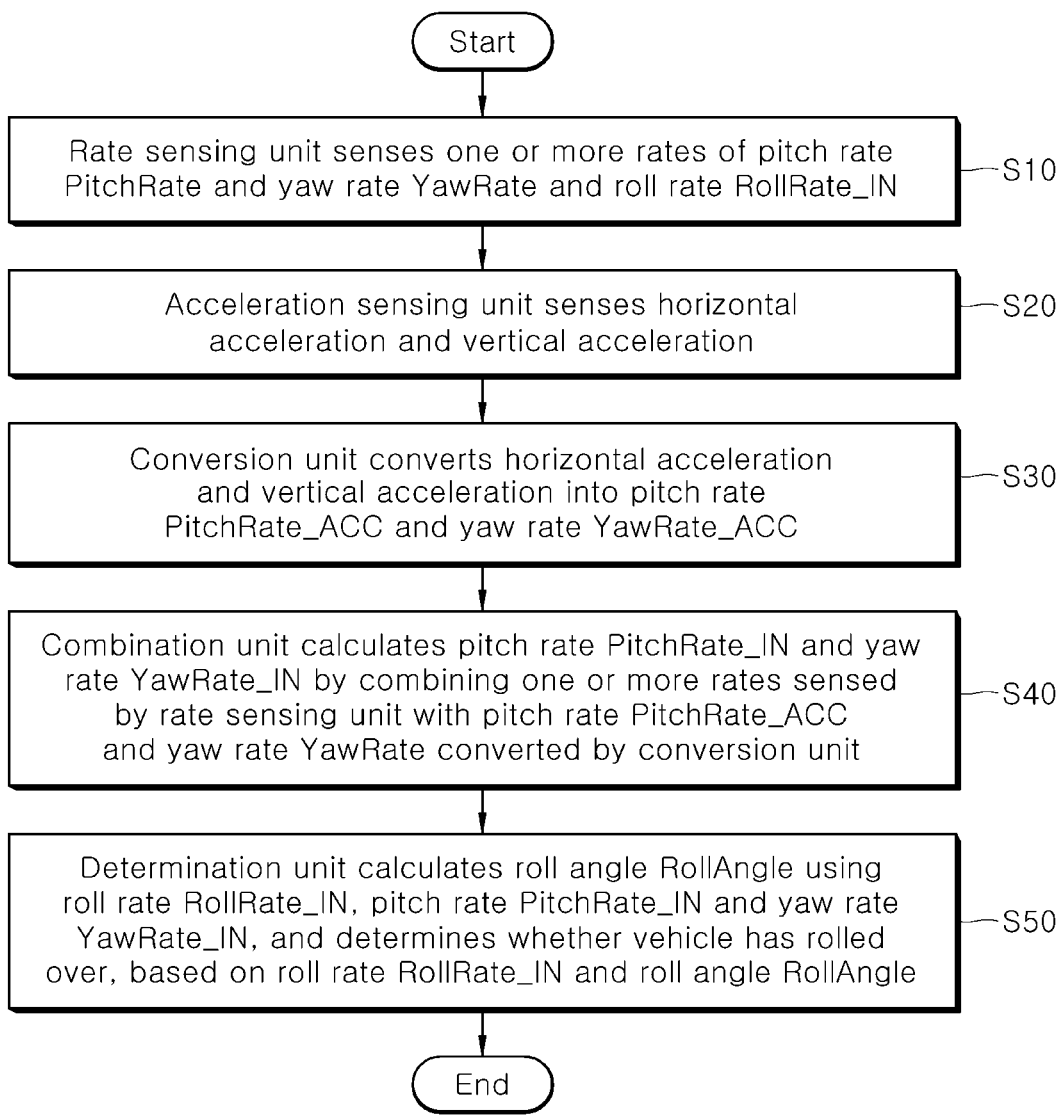
FIG. 9 is a flowchart illustrating a method for determining a rollover condition of a vehicle in accordance with an embodiment of the present invention.

FIG. 9 is a flowchart illustrating a method for determining a rollover condition of a vehicle in accordance with an embodiment of the present invention.

Referring to FIG. 9, the method for determining a rollover condition of a vehicle in accordance with the embodiment of the present invention will be described as follows. First, the rate sensing unit 10 may sense one or more rates of a pitch rate PitchRate and a yaw rate YawRate of the vehicle and a roll rate RollRate_IN at step S10. The rate sensing unit 10 may include one or more of a pitch rate sensor and a yaw rate sensor to sense one or more of the pitch rate PitchRate and the yaw rate YawRate of the vehicle. Furthermore, the rate sensing unit 10 may include a roll rate sensor to sense the roll rate RollRate_IN. The rate sensing unit 10 may include all of the pitch rate PitchRate, the yaw rate YawRate and the roll rate RollRate_IN. For this configuration, the rate sensing unit 10 may include a three-axis rate sensor such as a gyro-sensor.

Then, the acceleration sensing unit 20 may sense horizontal acceleration and vertical acceleration of the vehicle at step S20. The acceleration sensing unit 20 may include a two-axis acceleration sensor to sense the horizontal acceleration and the vertical acceleration. The acceleration sensing unit 20 may sense longitudinal acceleration as well as the horizontal acceleration and the vertical acceleration. In this case, the acceleration sensing unit 20 may include a three-axis acceleration sensor to sense the horizontal acceleration, the vertical acceleration and the longitudinal acceleration.

Then, the conversion unit 30 may convert the horizontal acceleration and the vertical acceleration, which are sensed by the acceleration sensing unit 20, into a pitch rate PitchRate_ACC and a yaw rate YawRate_ACC at step S30.

At step S30, the conversion unit 30 may correct the pitch rate PitchRate_ACC and the yaw rate YawRate_ACC based on the magnitudes of the converted pitch rate PitchRate_ACC and yaw rate YawRate_ACC. The conversion unit 30 may receive a roll angle RollAngle calculated through an Euler angle conversion process of step S50 which will be described, and correct the pitch rate PitchRate_ACC and the yaw rate YawRate_ACC based on the received roll angle RollAngle.

Then, the combination unit 40 may calculate the pitch rate PitchRate_IN and the yaw rate YawRate_IN for following the actual roll angle of the vehicle, by combining one or more of the pitch rate PitchRate and the yaw rate YawRate sensed by the rate sensing unit 10 with the pitch rate PitchRate_ACC and the yaw rate YawRate_ACC converted by the conversion unit 30, at step S40.

Then, the determination unit 50 may calculate a roll angle RollAngle using the roll rate RollRate_IN, the pitch rate PitchRate_IN and the yaw rate YawRate_IN, and determine whether the vehicle has rolled over, based on the roll rate RollRate_IN and the roll angle RollAngle, at step S50.

At step S50, the determination unit 50 may calculate the roll angle RollAngle by applying Euler angle conversion to the roll rate RollRate_IN, the pitch rate PitchRate_IN and the yaw rate YawRate_IN, and determine that the vehicle has rolled over, when the roll rate RollRate_IN and the roll angle RollAngle are equal to or more than threshold values preset for the roll rate RollRate_IN and the roll angle RollAngle, respectively.

The roll angle RollAngle and the pitch angle PitchAngle, which are calculated during the Euler angle conversion process of step S50, may be fed back to the conversion unit 30 and the combination unit 40, respectively.

Thus, at step S40, the combination unit 40 may receive the pitch angle PitchAngle calculated during the Euler angle conversion process of step S50 from the determination unit 50, and calculate the pitch rate PitchRate_IN and the yaw rate YawRate_IN by adjusting the combination ratio of the pitch rate PitchRate sensed by the rate sensing unit 10 to the pitch rate PitchRate_ACC converted by the conversion unit 30 or the combination ratio of the yaw rate YawRate sensed by the rate sensing unit 10 to the yaw rate YawRate_ACC converted by the conversion unit 30, according to the received pitch angle PitchAngle.

At step S40, the combination unit 40 may calculate the pitch rate PitchRate_IN as the pitch rate PitchRate_ACC converted by the conversion unit 30, in one or more of the case that only the yaw rate YawRate is sensed by the rate sensing unit 10 (for example, the absence of the pitch rate sensor) and the case that it is determined that the pitch rate PitchRate sensed by the rate sensing unit 10 is out of the corresponding expected range (for example, a breakdown of the pitch rate sensor). Furthermore, the combination unit 40 may calculate the yaw rate YawRate_IN as the yaw rate YawRate_ACC converted by the conversion unit 30, in one or more of the case that only the pitch rate PitchRate is sensed by the rate sensing unit 10 (for example, the absence of the yaw rate sensor) and the case that it is determined that the yaw rate YawRate sensed by the rate sensing unit 10 is out of the corresponding expected range (for example, a breakdown of the yaw rate sensor).

At step S40, when the horizontal acceleration sensed by the acceleration sensing unit 20 is out of the corresponding expected range (for example, a breakdown of the horizontal acceleration sensor), a normal yaw rate YawRate_ACC cannot be calculated according to Equation 2 or 3. Therefore, the combination unit 40 may calculate the yaw rate YawRate_IN as the yaw rate YawRate sensed by the rate sensing unit 10. This case is based on the supposition that the yaw rate YawRate is sensed by the sensing unit 10. Furthermore, when the vertical acceleration sensed by the acceleration sensing unit 20 is out of the corresponding expected range, a normal pitch rate PitchRate_ACC and a normal yaw rate YawRate_ACC cannot be calculated according to Equation 2 or 3. Thus, the combination unit 40 may calculate the pitch rate PitchRate_IN and the yaw rate YawRate_IN as the pitch rate PitchRate and the yaw rate YawRate which are sensed by the rate sensing unit 10, respectively. This case is based on the supposition that both of the pitch rate PitchRate and the yaw rate YawRate are sensed by the sensing unit 10.

In the present embodiment, it is described that the rate sensing unit 10 may sense the roll rate RollRate_IN, and sense one or more of the pitch rate PitchRate and the yaw rate YawRate. However, the rate sensing unit 10 may include none of the pitch rate sensor and the yaw rate sensor (for example, low-price vehicle). In this case, the rate sensing unit 10 may sense only the roll rate RollRate_IN, and the acceleration sensing unit 20 may sense the horizontal acceleration and the vertical acceleration of the vehicle, the conversion unit 30 convert the horizontal acceleration and vertical acceleration sensed by the acceleration sensing unit 20 into the pitch rate PitchRate_ACC and the yaw rate YawRate_ACC, and the determination unit 50 may calculate the roll angle RollAngle using the roll rate RollRate_IN, the pitch rate PitchRate_ACC and the yaw rate YawRate_ACC, and then determine whether the vehicle has rolled over, based on the roll rate RollRate_IN and the roll angle RollAngle. That is, when the rate sensing unit 10 includes only a roll rate sensor and includes none of the pitch rate sensor and the yaw rate sensor, the conversion unit 30 may convert the horizontal acceleration and vertical acceleration sensed by the acceleration sensing unit 20 into the pitch rate PitchRate_ACC and the yaw rate YawRate_ACC, and calculate the roll angle RollAngle based on the converted pitch rate PitchRate_ACC and yaw rate YawRate_ACC and the roll rate YawRate_IN sensed by the rate sensing unit 10. Therefore, the roll angle RollAngle can follow the actual roll angle of the vehicle more accurately than when only the roll rate sensor is used.

In accordance with the embodiments of the present invention, the apparatus and method for determining a rollover condition of a vehicle can calculate the roll angle into which an actual roll angle of the vehicle is reflected, by calculating the roll angle through the process of combining the rates sensed by the rate sensors with the rates converted from the accelerations sensed by the acceleration sensors, thereby improving the accuracy of the roll angle calculation. Therefore, the apparatus and method can precisely determine a rollover condition of the vehicle, thereby preventing degradation in driving stability of a driver, which may occur when a restraint device such as an airbag is unexpectedly deployed.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An apparatus for determining a rollover condition of a vehicle, comprising:
   a rate sensing unit configured to sense one or more rates of a pitch rate PitchRate and a yaw rate YawRate of a vehicle and a roll rate RollRate_IN;
   an acceleration sensing unit configured to sense horizontal acceleration and vertical acceleration of the vehicle;
   a conversion unit connected to and receiving the sensed horizontal acceleration and vertical acceleration of the vehicle from the acceleration sensing unit, and configured to convert the received horizontal acceleration and vertical acceleration into a pitch rate PitchRate_ACC and a yaw rate YawRate_ACC, respectively;
   a combination unit connected to and receiving the one or more rates from the rate sensing unit, connected to and receiving the pitch rate PitchRate_ACC and yaw rate YawRate_ACC from the conversion unit, and configured to calculate a pitch rate PitchRate_IN and a yaw rate YawRate_IN for estimating an actual roll angle of the vehicle by combining the one or more rates sensed by the rate sensing unit with the pitch rate PitchRate_ACC and yaw rate YawRate_ACC converted by the conversion unit; and
   a determination unit connected to and receiving the roll rate RollRate_IN from the rate sensing unit, connected to and receiving the pitch rate PitchRate_IN and the yaw rate YawRate_IN from the combination unit, and configured to calculate a roll angle RollAngle using the roll rate RollRate_IN, the pitch rate PitchRate_IN and the yaw rate YawRate_IN, and determine whether the vehicle has rolled over based on the roll rate RollRate_IN and the roll angle RollAngle.

2. The apparatus of claim 1, wherein the determination unit is further configured to calculate the roll angle RollAngle by applying Euler angle conversion to the roll rate RollRate_IN, the pitch rate PitchRate_IN and the yaw rate YawRate_IN.

3. The apparatus of claim 2, wherein the conversion unit is connected to and receive the roll angle RollAngle from the determination unit and further configured to correct the pitch rate PitchRate_ACC and the yaw rate YawRate_ACC based on magnitudes of the converted pitch rate PitchRate_ACC and yaw rate YawRate_ACC and a magnitude of the roll angle RollAngle received from the determination unit.

4. The apparatus of claim 3, wherein the conversion unit is further configured to:
   correct the pitch rate PitchRate_ACC to 0 when the magnitude of the pitch rate PitchRate_ACC is out of a first threshold range;
   correct the yaw rate YawRate_ACC to 0 when the magnitude of the yaw rate YawRate_ACC is out of a second threshold range; and
   correct both of the pitch rate PitchRate_ACC and the yaw rate YawRate_ACC to 0 when the magnitude of the roll angle RollAngle is out of a third threshold range.

5. The apparatus of claim 2, wherein the combination unit is further configured to:
   receive, from the determination unit, a pitch angle PitchAngle calculated during an Euler angle conversion process by the determination unit; and
   calculate the pitch rate PitchRate_IN and the yaw rate YawRate_IN by adjusting a combination ratio of the pitch rate PitchRate sensed by the rate sensing unit to the pitch rate PitchRate_ACC converted by the conversion unit or the combination ratio of the yaw rate YawRate sensed by the rate sensing unit to the yaw rate YawRate_ACC converted by the conversion unit, according to the received pitch angle PitchAngle.

6. The apparatus of claim 5, wherein the combination unit is configured to:
   calculate the pitch rate PitchRate_IN as the pitch rate PitchRate_ACC converted by the conversion unit when only the yaw rate YawRate is sensed by the rate sensing unit or the pitch rate PitchRate sensed by the rate sensing unit is out of a corresponding expected range; and calculates calculate the yaw rate YawRate_IN as the yaw rate YawRate_ACC converted by the conversion unit when only the pitch rate PitchRate is sensed by the rate sensing unit or the yaw rate YawRate sensed by the rate sensing unit is out of a corresponding expected range.

7. The apparatus of claim 5, wherein the combination unit is further configured to:
   calculate the yaw rate YawRate_IN as the yaw rate YawRate sensed by the rate sensing unit, when it is determined that the horizontal acceleration sensed by the acceleration sensing unit is out of a corresponding expected range, and
   calculate the pitch rate PitchRate_IN and the yaw rate YawRate_IN as the pitch rate PitchRate and yaw rate YawRate sensed by the rate sensing unit, respectively, when it is determined that the vertical acceleration sensed by the acceleration sensing unit is out of a corresponding expected range.

8. The apparatus of claim 1, wherein the determination unit is further configured to determine that the vehicle has rolled over when the roll rate RollRate_IN and the roll angle RollAngle are equal to or more than a threshold values preset for the roll rate RollRate_IN and the roll angle RollAngle, respectively.

9. A method for determining a rollover condition of a vehicle, comprising: sensing, using a rate sensing unit, one or more rates of a pitch rate PitchRate and a yaw rate YawRate of a vehicle and a roll rate RollRate_IN; sensing, using an acceleration sensing unit, horizontal acceleration and vertical acceleration of the vehicle; converting, using a conversion unit, the sensed horizontal acceleration and vertical acceleration into a pitch rate PitchRate_ACC and a yaw rate YawRate_ACC, respectively; calculating, using a combination unit, a pitch rate PitchRate_IN and a yaw rate YawRate_IN for estimating an actual roll angle of the vehicle by combining the sensed one or more rates with the pitch rate PitchRate_ACC and yaw rate YawRate_ACC; and calculating, using a determination unit, a roll angle RollAngle using the roll rate RollRate_IN, the pitch rate PitchRate_IN and the yaw rate YawRate_IN, and determining whether the vehicle has rolled over based on the roll rate RollRate_IN and the roll angle RollAngle.

10. The method of claim 9, wherein determining whether the vehicle has rolled over comprises calculating, using the determination unit, the roll angle RollAngle by applying Euler angle conversion to the roll rate RollRate_IN, the pitch rate PitchRate_IN and the yaw rate YawRate_IN.

11. The method of claim 10, wherein converting the horizontal acceleration and vertical acceleration comprises correcting, using the conversion unit, the pitch rate PitchRate_ACC and the yaw rate YawRate_ACC based on magnitudes of the converted pitch rate PitchRate_ACC and yaw rate YawRate_ACC and a magnitude of the roll angle RollAngle.

12. The method of claim 11, wherein converting the horizontal acceleration and vertical acceleration comprises: correcting, using the conversion unit, the pitch rate PitchRate_ACC to 0 when the magnitude of the pitch rate PitchRate_ACC is out of a first threshold range; correcting, using the conversion unit, the yaw rate YawRate_ACC to 0 when the magnitude of the yaw rate YawRate_ACC is out of a second threshold range; and correcting, using the conversion unit, both of the pitch rate Pitch Rate_ACC and the yaw rate YawRate_ACC to 0 when the magnitude of the roll angle RollAngle is out of a third threshold range.

13. The method of claim 10, wherein calculating the pitch rate PitchRate_IN and yaw rate YawRate_IN comprises: receiving a pitch angle PitchAngle calculated during from an Euler angle conversion process; and calculating, using the combination unit, the pitch rate PitchRate_IN and the yaw rate YawRate_IN by adjusting the combination ratio of the pitch rate PitchRate to the converted pitch rate PitchRate_ACC or a combination ratio of the yaw rate YawRate to the yaw rate YawRate_ACC according to the received pitch angle PitchAngle.

14. The method of claim 13, wherein calculating the pitch rate PitchRate_IN and yaw rate YawRate_IN comprises: calculating, using the combination unit, the pitch rate PitchRate_IN as the pitch rate PitchRate_ACC when only the yaw rate YawRate is sensed or the pitch rate PitchRate is out of a corresponding expected range; and calculating, using the combination unit, the yaw rate YawRate_IN as the yaw rate YawRate_ACC when only the pitch rate PitchRate is sensed or the yaw rate YawRate is out of a corresponding expected range.

15. The method of claim 13, wherein calculating the pitch rate PitchRate_IN and yaw rate YawRate_IN comprises: calculating, using the combination unit, the yaw rate YawRate_IN as the yaw rate YawRate when it is determined that the horizontal acceleration is out of a corresponding expected range; and calculating, using the combination unit, the pitch rate PitchRate_IN and the yaw rate YawRate_IN as the pitch rate PitchRate and yaw rate YawRate, respectively, when it is determined that the vertical acceleration is out of a corresponding expected range.

16. The method of claim 9, wherein determining whether the vehicle has rolled over comprises determining, using the determination unit, that the vehicle has rolled over when the roll rate RollRate_IN and the roll angle RollAngle are equal to or more than a threshold values set for the roll rate RollRate_IN and the roll angle RollAngle, respectively.

17. An apparatus for determining a rollover condition of a vehicle, comprising:
a rate sensing unit configured to sense a roll rate RollRate_IN of a vehicle;
an acceleration sensing unit configured to sense horizontal acceleration and vertical acceleration of the vehicle;
a conversion unit connected to and receiving the sensed horizontal acceleration and vertical acceleration of the vehicle from the acceleration sensing unit, and configured to convert the received horizontal acceleration and vertical acceleration into a pitch rate PitchRate_ACC and a yaw rate YawRate_ACC, respectively; and
a determination unit connected to and receiving roll rate RollRate IN from the rate sensing unit and configured to calculate a roll angle RollAngle using the roll rate RollRate_IN, the pitch rate PitchRate_ACC and the yaw rate YawRate_ACC, and determine whether the vehicle has rolled over based on the roll rate RollRate_IN and the roll angle RollAngle.

* * * * *